(12) United States Patent
Yamaguchi et al.

(10) Patent No.: US 6,493,828 B1
(45) Date of Patent: Dec. 10, 2002

(54) INFORMATION PROCESSING APPARATUS, INFORMATION PROCESSING METHOD, AND PROGRAM STORAGE MEDIUM

(75) Inventors: Yoshihiro Yamaguchi, Tokyo (JP); Takahiko Sueyoshi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/385,398

(22) Filed: Aug. 30, 1999

(30) Foreign Application Priority Data

Aug. 31, 1998 (JP) ............................................ 10-244663

(51) Int. Cl.[7] .............................. G06F 1/26; G06F 1/32
(52) U.S. Cl. ........................ 713/324; 713/323; 713/330
(58) Field of Search ................................ 713/323, 324, 713/330

(56) References Cited

U.S. PATENT DOCUMENTS

| | | | | | |
|---|---|---|---|---|---|
| 5,610,730 | A | * | 3/1997 | Osipchuk ..................... | 358/494 |
| 5,983,073 | A | * | 11/1999 | Ditzik ......................... | 455/11.1 |
| 6,111,609 | A | * | 8/2000 | Stevens ........................ | 348/372 |
| 6,226,237 | B1 | * | 5/2001 | Chan et al. .................... | 710/14 |
| 6,266,714 | B1 | * | 7/2001 | Jacobs et al. .................. | 710/14 |

* cited by examiner

Primary Examiner—Thomas Lee
Assistant Examiner—James K. Trujillo
(74) Attorney, Agent, or Firm—Frommer Lawrence & Haug LLP; William S. Frommer; Dennis M. Smid

(57) ABSTRACT

Disclosed herein are an information processing apparatus, an information processing method, and a program storage medium that allow a user to quickly capture an image upon instruction by the user. The information processing apparatus comprising an instructing means for instructing image capturing, an image pick-up means for imaging a subject as instructed through the instructing means and generating image data based on the imaged subject, a recording means for recording the image data generated by the image pick-up means, and a control means for starting fewest possible means required for image capturing including at least the image pick-up means and the recording means when image capturing is instructed through the instructing means with the information processing apparatus in one of an power-off state and an energy saving mode, controlling the started means, and recording the image data generated by the image pick-up means onto the recording means.

13 Claims, 7 Drawing Sheets

F I G. 6
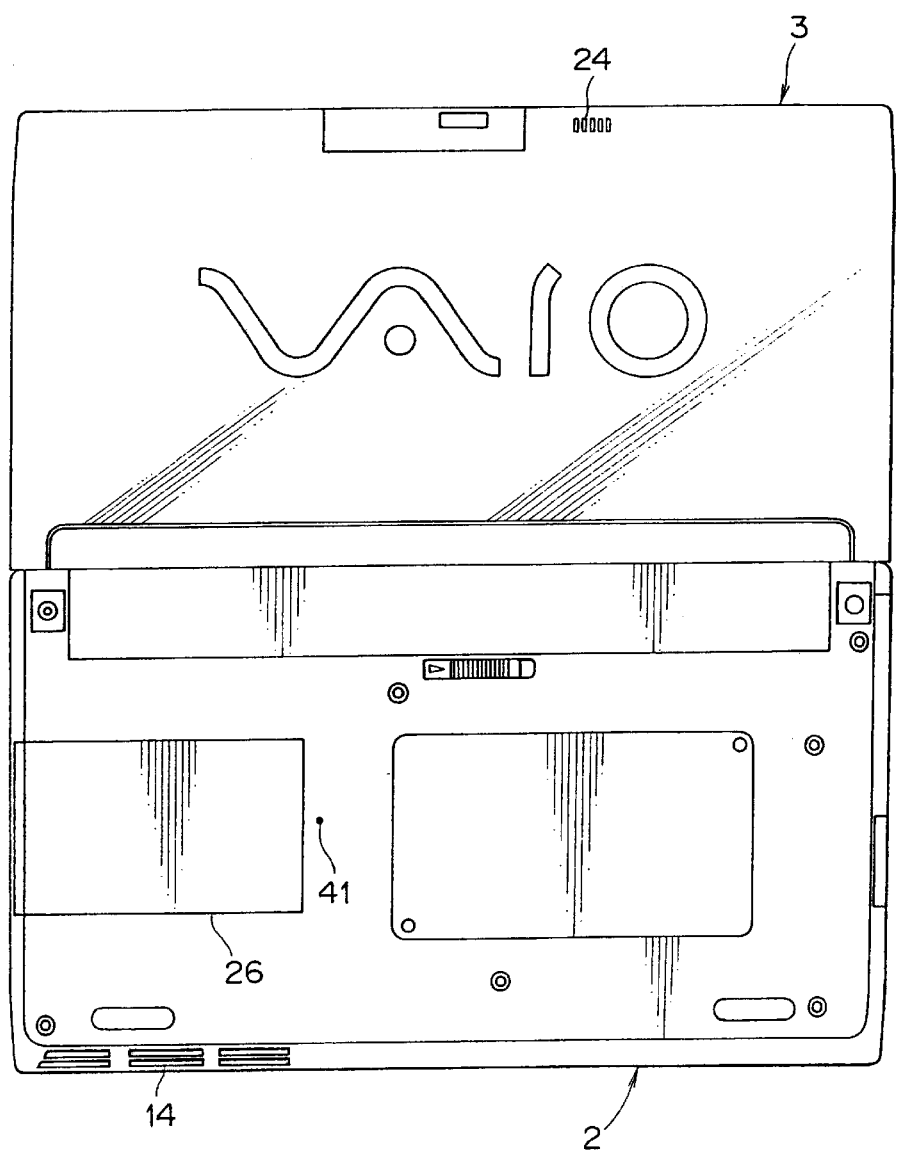

INFORMATION PROCESSING APPARATUS, INFORMATION PROCESSING METHOD, AND PROGRAM STORAGE MEDIUM

BACKGROUND OF THE INVENTION

The present invention relates generally to an information processing apparatus, an information processing method, and a program storage medium that are capable of instantly picking up images through a built-in CCD (Charge Coupled Device) video camera, even if the video camera is in the power-off state or in the power saving mode.

A BIOS (Basic Input/Output System) is a system program (or a group of system routines) for controlling the basic input/output operations depending on the hardware of a personal computer and installed on its mother board as stored in a ROM (Read Only Memory) or a flash memory. The operations in a personal computer to be executed from the time when the personal computer is powered on up to the time when the OS (Operating System) such as Windows 98 (trademark) of Microsoft Corporation starts up are all controlled by the BIOS.

In addition to the above-mentioned BIOS, a socalled keyboard BIOS is incorporated in the keyboard controller on the mother board. Therefore, the former is referred to as a system BIOS while the latter is referred to as a keyboard BIOS. These BIOS's and various device drivers depend on the hardware of various devices and so on, so that these BIOS's and various device drivers are sometimes generically referred to as hardware-dependent programs or low-level system programs. The hardware-dependent programs are used hereinafter. By the same token, the OS (operating system) is a hardware-independent high-level system program. The operating system is simply referred to as the OS herein.

Portable (or note-type) personal computers are powered by a battery incorporated therein. In order to extend the power supply as long as possible, most portable personal computers are provided with power saving mode called suspend mode or sleep mode.

A portable personal computer enters the suspend mode when the computer is out of use for a certain length of time. When the computer enters the suspend mode, all CPU operations are suspended, upon which the power supply to the hardware components is stopped, except for some circuits requiring backup. Thus, power consumption of the battery is suppressed.

When the user wants to have the computer process certain information during the suspend mode, the user must clear the suspend mode by performing a predetermined key operation. After the user performs this operation, the computer gets out of the suspend mode, upon which the above-mentioned OS is fully resumed to make the computer ready for executing the processing required by the user.

Sometimes, there are cases that the user wants to quickly shoot images, either moving or stationary, when his or her portable personal computer having the CCD camera for moving/still images is in power-off state or in suspend mode. In such a situation, the computer must be firstly got out of the suspend mode. This, however, takes a certain time until the OS is fully resumed, sometimes making the shooting timing too late.

SUMMARY OF THE INVENTION

It is therefore an object of the present invention to allow the user to pick up and record images through the CCD video camera incorporated in a personal computer immediately upon instructing the same held in power-off state or suspend mode for image capturing.

In carrying out the invention and according to one aspect thereof, there is provided an information processing apparatus comprising: an instructing means for instructing image capturing; an imaging means for imaging a subject as instructed through the instructing means and generating image data based on the imaged subject; a recording means for recording the image data generated by the imaging means; and a control means for starting fewest possible means required for image capturing including at least the imaging means and the recording means when image capturing is instructed through the instructing means with the information processing apparatus in one of an power-off state and an energy saving mode, controlling the started device, and recording the image data generated by the imaging means onto the recording means.

In carrying out the invention and according to another aspect thereof, there is provided an information processing. method for use in an information processing apparatus comprising an instructing means for instructing image capturing, an imaging means for imaging a subject as instructed through the instructing means, and recording means for recording image data generated by the imaging means, the information processing method comprising the steps of: starting each of fewest possible means required for image capturing including at least the imaging means and the recording means when image capturing is instructed through the instructing means with the information processing apparatus in one of an power-off state and an energy saving mode; and controlling each of the started means to record the image data generated by the imaging means onto the recording means.

In carrying out the invention and according to still another aspect thereof, there is provided a program storage medium for storing a computer program comprising the steps of: starting each of fewest possible means required for image capturing including at least the imaging means and the recording means when image capturing is instructed through the instructing means with the information processing apparatus in one of an power-off state and an energy saving mode; and controlling each of the started means to record the image data generated by the imaging means onto the recording means.

According to the information processing apparatus, the information processing method, and the program storage medium of the present invention, when image capturing is instructed with the information processing apparatus either in power-off state or in power saving mode, only fewest possible means necessary for the image capturing are started. Through these means, a desired image is picked up and recorded. The novel setup allows the user to quickly capture images without missing the timing of image pick-up.

BRIEF DESCRIPTION OF THE DRAWINGS

These and other objects of the invention will be seen by reference to the description, taken in connection with the accompanying drawing, in which:

FIG 6 is a bottom view of FIG. 4;

DETAILED DESCRIPTION OF PREFERRED EMBODIMENT

The present invention will be described in further detail by way of examples with reference to the accompanying drawings.

Figure 1:
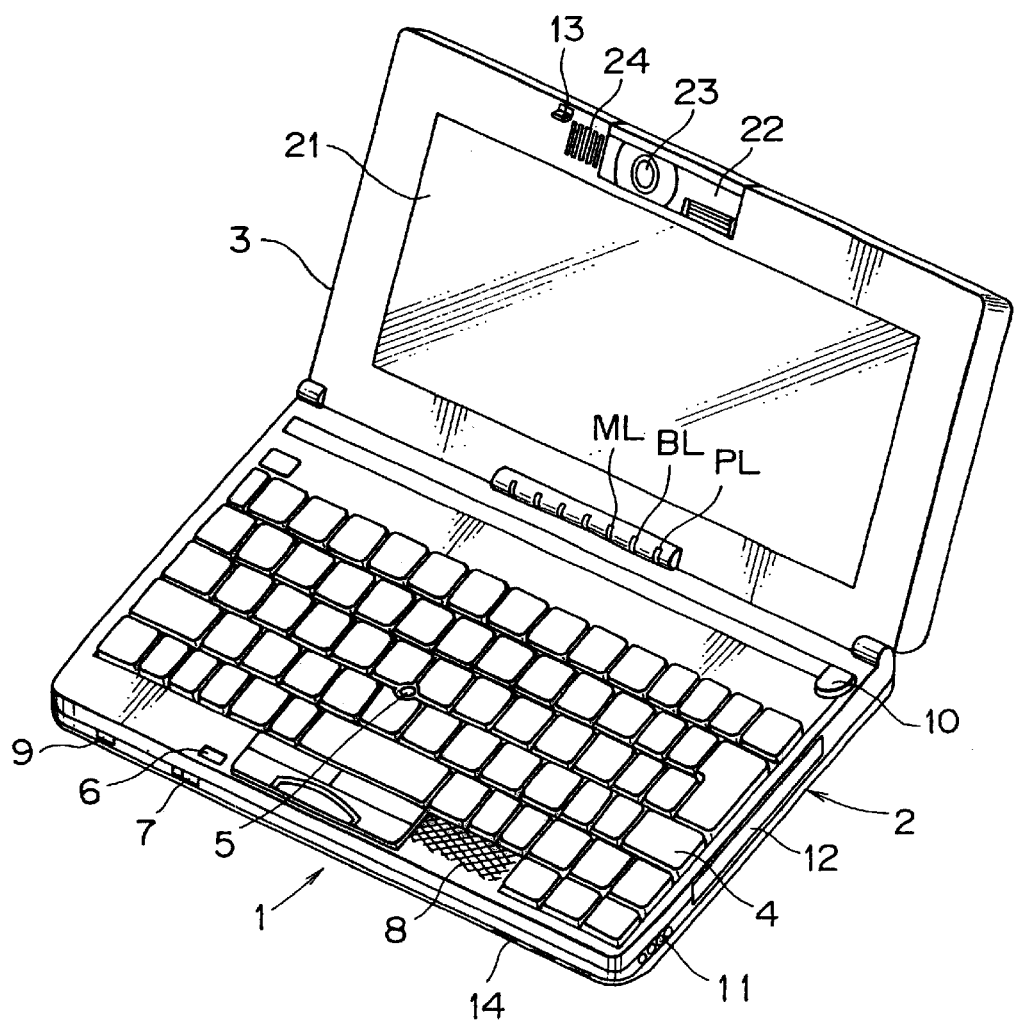
FIG. 1 is an external perspective view illustrating a constitution of a portable personal computer practiced as one preferred embodiment of the invention, a display block of the computer being open relative to the body thereof.
Figure 2:
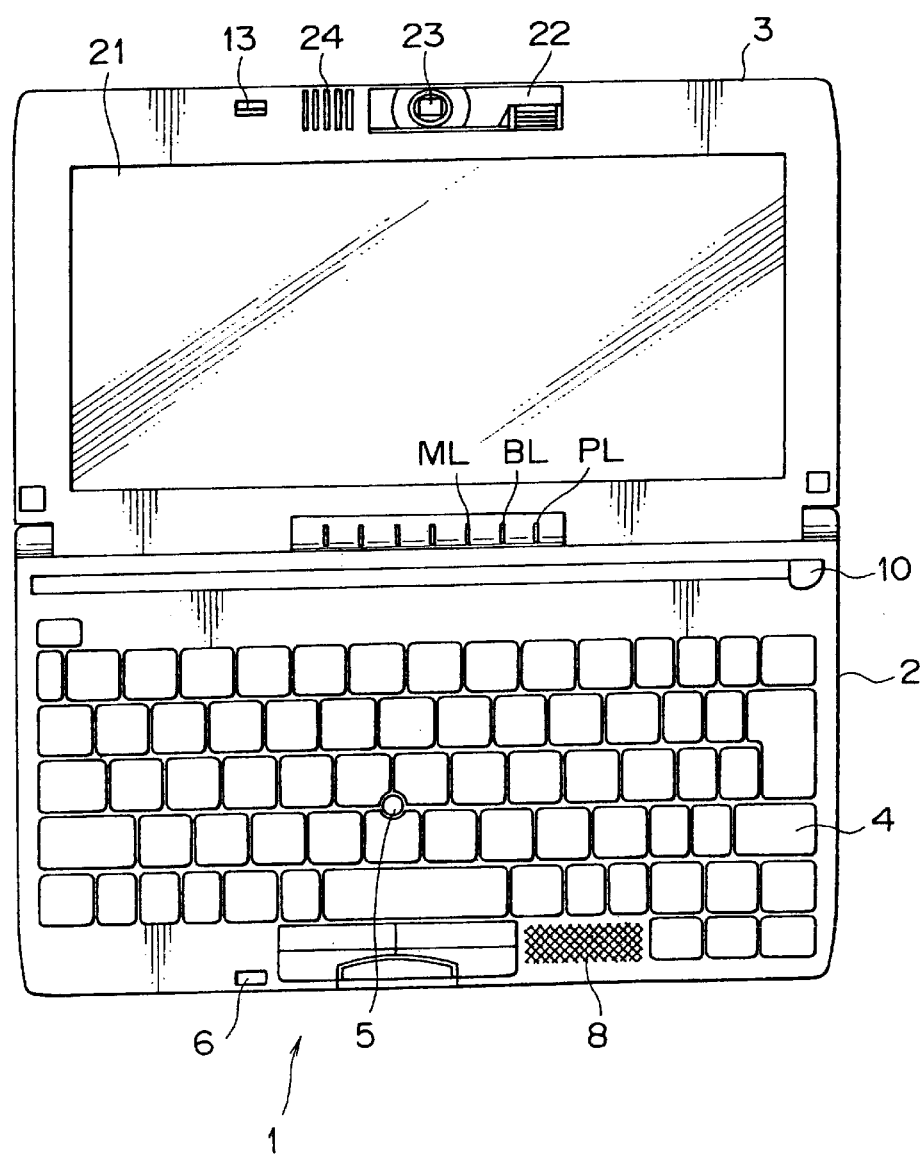
FIG. 2 is a top view of the embodiment shown in FIG. 1.
Figure 3:
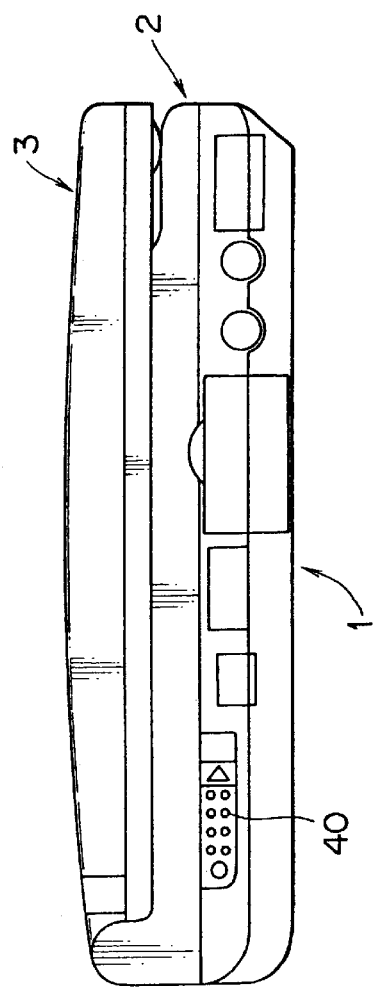
FIG. 3 is left side view illustrating the embodiment shown in FIG. 1 with the display block closed relative to the body.
Figure 4:
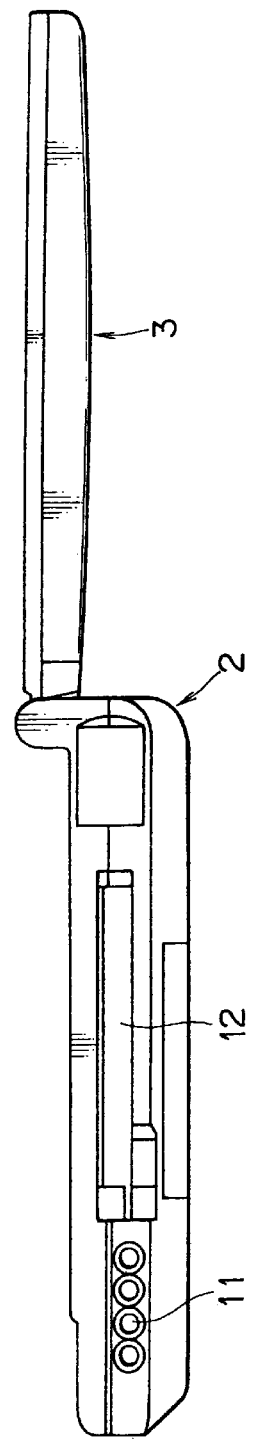
FIG. 4 is a right side view illustrating the embodiment shown in FIG. 1 with the display block opened 180 degrees relative to the body.
Figure 5:
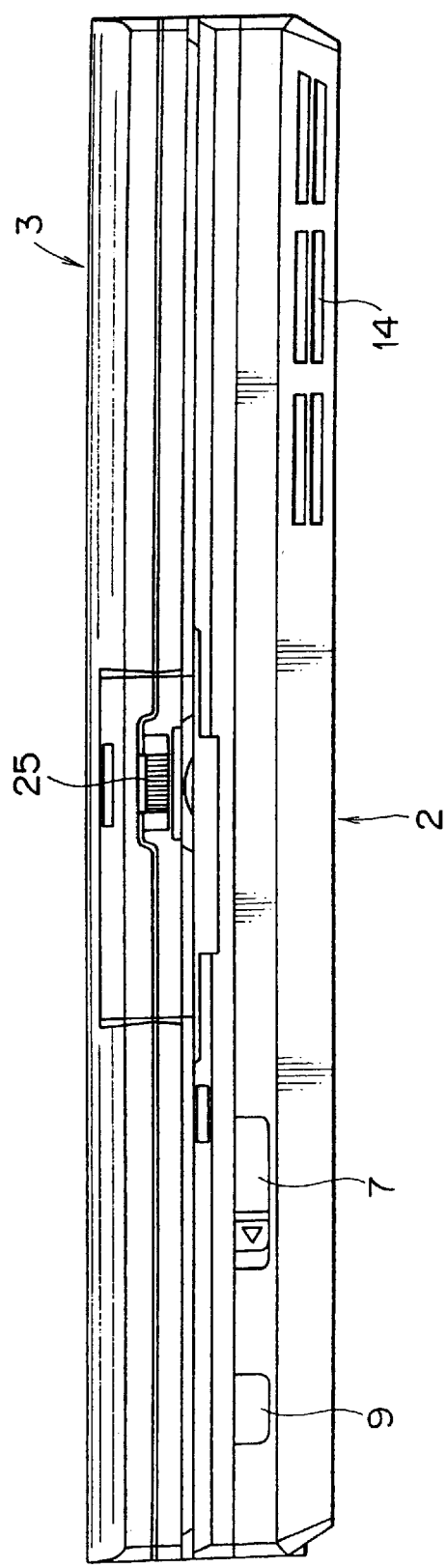
FIG. 5 is an evational view of FIG. 3.

FIGS. 1 through 6 illustrate an exemplary constitution of a portable personal computer practiced as one preferred embodiment of the invention. In the figures, the personal computer 1 is of mini-notebook type, which is basically composed of a main body 2 and a display block 3 pivotally mounted thereon. FIG. 1 perspectively illustrates the personal computer 1 with the display block 3 open relative to the main body 2. FIG. 2 is a top view of the personal computer 1 shown in FIG. 1. FIG. 3 is a left side view illustrating the personal computer 1 shown in FIG. 1 with the display block 2 closed against the main body 2. FIG. 4 is a right side view illustrating the personal computer 1 shown in FIG. 1 with the display block 3 open by 180 degrees relative to the main body 2. FIG. 5 is a top view illustrating the personal computer 1 shown in FIG. 3. FIG. 6 is a bottom view illustrating the personal computer 1 shown in FIG. 4.

The main body 2 is arranged on the top thereof with a keyboard 4 that is operated to enter various characters and symbols and a stick-type pointing device 5 that is operated to move a mouse cursor for example. The main body 2 is further arranged on the top thereof with a speaker 8 for outputting sound and a shutter button 10 that is operated to pick up an image through a CCD video camera 23 disposed on the display block 3.

A claw 13 is disposed on the upper end of the display block 3. A hole 6 in which the claw 13 mates is disposed on the main body 2 at a position that corresponds to the position of the claw 13 when the display block 3 is closed against the main body 2. A slide lever 7 is disposed on the front face of the main body 2 in a movable manner parallely along the front face. The slide lever 7 is adapted to latch and unlatch the claw 13 mated in the hole 6. In the unlocked state, the display block 3 can be pivotally moved relative to the main body 2. A microphone 24 is disposed beside the claw 13. As shown in FIG. 6, the microphone 24 can also pick up sound coming from the back of the personal computer 1.

The front face of the main body 2 is also disposed with a programmable power key (PPK) 9. On the right-side face of the main body 2, an exhaust port 11 is disposed as shown in FIG. 4. On the lower portion of the front face of the main body 2, an intake port 14 is disposed as shown in FIG. 5. To the right of the exhaust port 11, a slot 12 is disposed for accommodating a PCMCIA (Personal Computer Memory Card International Association) card (a PC card in short).

On the top face of the display block 3, an LCD (Liquid Crystal Display) 21 is disposed for displaying images. On the upper end of the display block 3, an imaging block 22 is disposed in a pivotally movable manner relative to the display block 3. To be more specific, the imaging block 22 can pivotally move to any position in a range of 180 degrees at right angles to the vertical direction of the display block 3. The imaging block 22 has the CCD video camera 23.

In the lower portion of the display block 3, a power lamp PL, a battery lamp BL, a message lamp ML, and other light or lights each constituted by an LED (Light Emitting Diode) are arranged, facing to the main body 2. Reference numeral 40 shown in FIG. 3 denotes a power switch disposed on the left side face of the main body 2. Reference numeral 25 shown in FIG. 5 denotes an adjustment ring for adjusting focus of the CCD video camera 23. Reference numeral 26 shown in FIG. 6 denotes a cover for an opening through which an add-on memory is installed in the main body 2. Reference numeral 41 denotes a hole through which a pin to unlatch a claw locking the cover 26 from the main body 2 is inserted.

Figure 7:
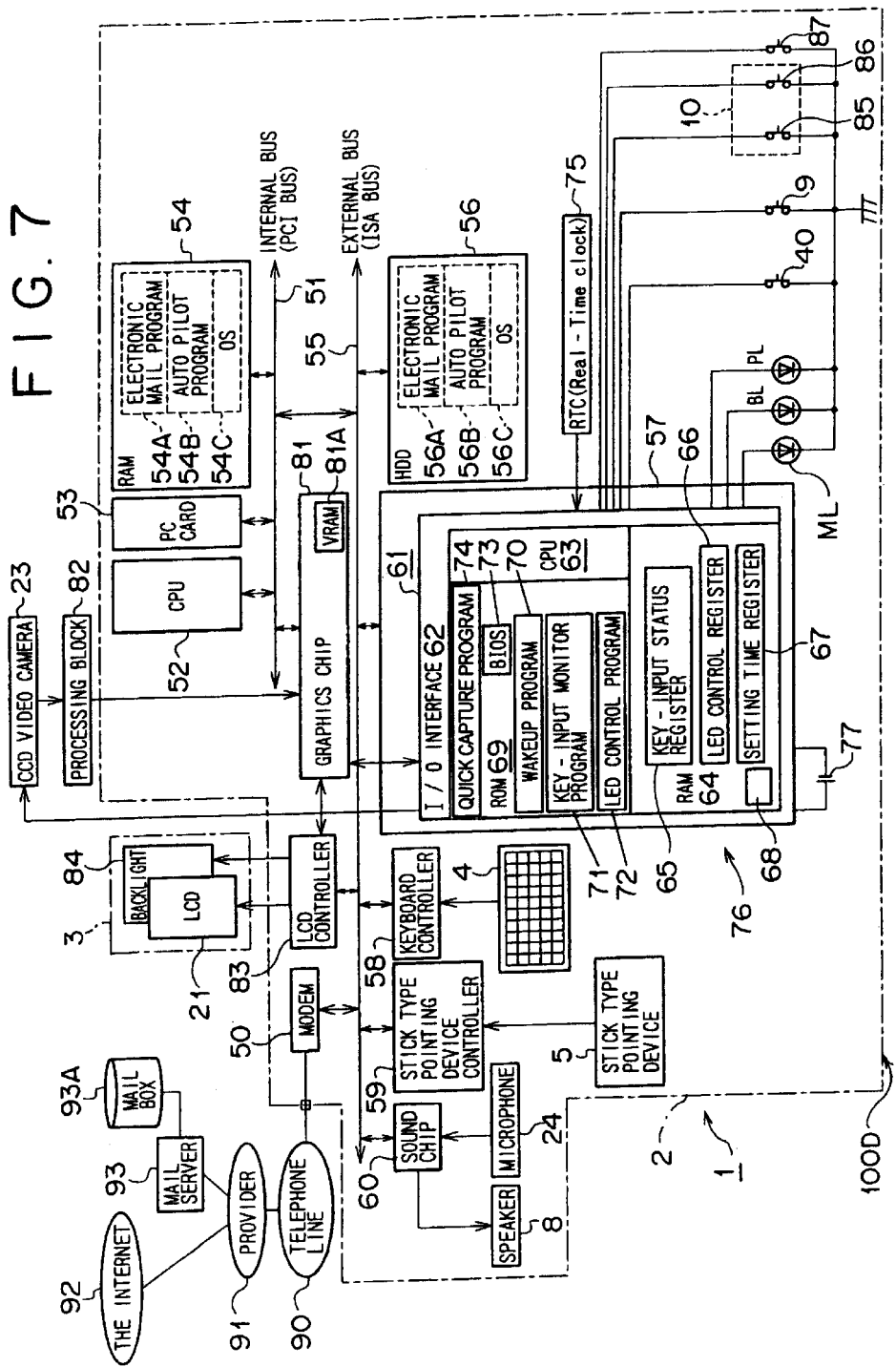
FIG. 7 is a block diagram illustrating a constitution of the electric circuit of the embodiment shown in FIG. 1.

FIG. 7 exemplifies the internal constitution of the personal computer 1. As shown in the figure, an internal bus 51 is connected to a CPU (Central Processing Unit) 52, a PC card 53 that is inserted as required, a RAM (Random Access Memory) 54, and a graphics chip 81. The internal bus 51 is also connected to an external bus 55. The external bus 55 is connected to the hard disk drive (HDD) 56, an I/O (Input/Output) controller 57, a keyboard controller 58, a stick-type pointing device controller 59, a sound chip 60, an LCD controller 83, and a modem 50.

The CPU 52 controls the above-mentioned components and capabilities of the personal computer 1. The PC card 53 is inserted to add an optional capability, if necessary.

The RAM 54 stores, when the personal computer 1 completes boot-up, an electronic mail program (an application program) 54A, an auto pilot program (an application program) 54B, and an OS (Operating System) 54C transferred from the HDD 56.

The electronic mail program 54A handles electronic messages transferred from a network through a communication line like telephone line. The electronic mail program 54A has an in-coming mail capturing capability as a particular capability. The in-coming mail capturing capability checks a mail box 93A of a mail server 93 whether or not an e-mail addressed to that user has arrived, and if such a mail is found, captures the same.

The auto pilot program 54B sequentially starts plural preset processing operations (or programs) in a predetermined order for executing processing.

The OS 54C controls basic computer operations exemplified by Windows 98 (trademark).

The HDD 56 on the external bus 55 stores an electronic mail program 56A, an auto pilot program 56B, and an OS 56C. These programs are sequentially sent into the RAM 54 in the middle of the boot-up processing and held therein.

The I/O controller 57 has a microcontroller 61 provided therewith an I/O interface 62. The microcontroller 61 is constituted by the I/O interface 62, a CPU 63, a RAM 64, and a ROM 69 interconnected with each other. The RAM 64 has a key-input status register 65, an LED control register 66, a setting time register 67, and a register 68. The setting time register 67 is used to start a boot-up sequence controller 76 when a time (or a boot-up condition) preset by user comes. The register 68 holds the correspondence between a preset operator key combination and an application program to be started. When the user enters this operator key combination, the corresponding application program (for example, the electronic mail program) starts.

The key-input status register 65 holds an operator key flag when the PPK 9 for single-touch operation is pressed. The LED control register 66 controls the turnon/off of the message lamp ML that indicates the operating state of the application program (the electronic mail program) held in the register 68.. The user can set any desired time to the time setting register 67.

A backup battery 77 is connected to the microcontroller 61, thereby preventing the values set to the registers 65, 66, and 67 from being cleared after the main body 2 is powered off.

The ROM 69 in the microcontroller 61 stores a wakeup program 70, a key-input monitor program 71, an LED control program 72, and a quick capture program 74 in advance. The ROM 69 is constructed of an EEPROM (Electrically Erasable and Programmable Read Only Memory) for example. The EEPROM is also known as a flash memory. An RTC (Real-Time Clock) 75 for always counting current time is also connected to the microcontroller 61.

The wake-up program 70 stored in the ROM 69 checks, based on the current time data supplied from the RTC 75, whether or not the time preset to the setting time register 67 has been reached. If the time is found reached, the wake-up program 70 starts a predetermined processing operation (or a predetermined program) at the preset time. The key-input monitor program 71 monitors whether or not the PPK 9 is pressed by the user. The LED control program 72 controls the turn-on/off of the message lamp ML.

The ROM 69 also stores a BIOS (Basic Input/Output System) 73. The BIOS is a software program for controlling the exchange (or input/output) of data between the OS and application software and peripheral units (display, keyboard, hard disk drive, and so on). The quick capture program 74 performs quick capture processing to be described later.

The quick capture program 74 is a hardware-dependent low-level system program equivalent to BIOS and is executed alone by the CPU 52 without coordination with the OS.

The keyboard controller 58 connected to the external bus 55 controls the input made through the keyboard 4. The stick-type pointing device controller 59 controls the input made on the stick-type pointing device 5.

The sound chip 60 captures the input from the microphone 24 and supplies an audio signal to the built-in speaker 8.

The modem 50 connects the personal computer 1 to a communication network 92 such as the Internet or the mail server 93 through a public telephone line 90 and an Internet service provider 91.

The graphics chip 81 connected to the internal bus 51 is adapted to store the image data captured through the CCD video camera 23 and processed by the processing block 82. The graphics chip 81 stores the video data inputted from the CCD video camera 23 through the processing block 82 into a built-in VRAM 81A and reads the stored video data as required, outputting the same to the LCD controller 83. The LCD controller 83 outputs the image data supplied from the graphics chip 81 to LCD 21 for display. A back light 84 illuminates the LCD 21 from behind the same.

The power switch 40 turns on/off the power of the personal computer 1. A half-press switch 85 is turned on when the shutter button 10 is pressed to the half position. A full-press switch 86 is turned on when the shutter button 10 is fully pressed. A reverse switch 87 is turned on when the imaging block 22 is rotated 180 degrees (namely, when the CCD video camera 23 is rotated in the direction behind the LCD 21).

It should be noted that the personal computer 1 provides three power-saving modes. In the normal mode, a particular device, such as the modem 50 or the LCD 21, is set to be powered off for power saving.

In the suspend mode, the currently operated state is stored in the RAM 54 and then the power supply to the CPU 52 is turned off. The suspend mode is set when the user wants to discontinue a currently executed job and resume it in the following day, for example. In this mode, the CPU 52 is powered off, so that the power consumption of the personal computer is reduced. The suspend mode is set by operating a predetermined key, by sliding the power switch 40 for less than 2 seconds, or by use of the stick-type pointing device 5 on the screen displayed on the LCD 21. To return to the normal mode, the user may only operate any key on the keyboard 4 or operate the stick-type pointing device 5.

In the power-off mode, all power supplies are turned off, so that the power consumption of the personal computer is zero. The power-off mode is set by operating the power switch 40. In other words, when the user operates the power switch 40 in the power-off mode, the personal computer enters the normal mode. When the user operates the power switch 40 in the normal mode, the personal computer enters the power-off mode.

Figure 8:
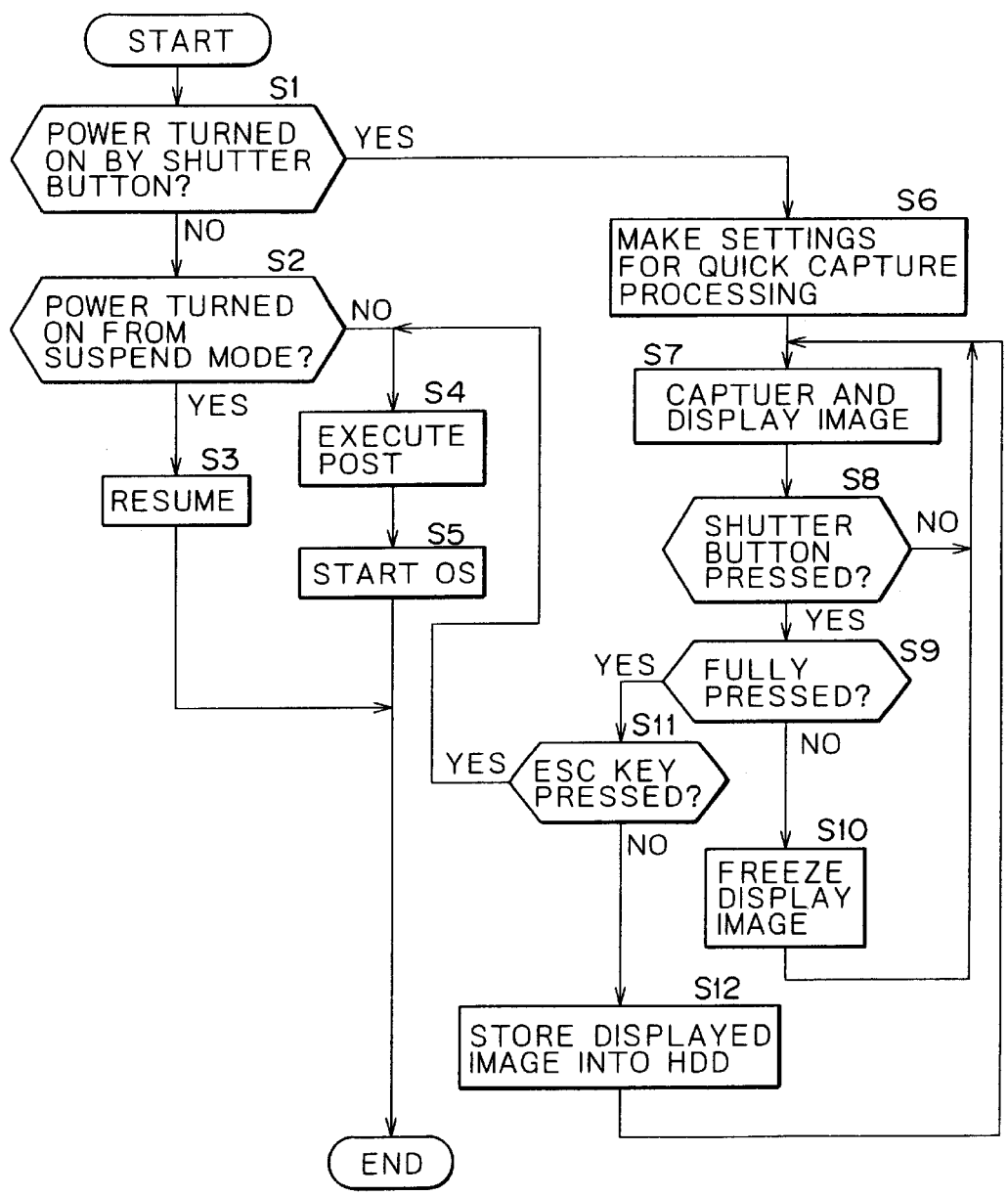
FIG. 8 is a flowchart describing quick capture processing.

The following describes the operations of the personal computer 1 that can be put in any of the above-mentioned power saving modes with reference to the flowchart shown in FIG. 8. When the personal computer 1 is powered on by user's performing a predetermined operation, the CPU 52 determines in step S1 whether the power has been turned on or not by operation of the shutter button 10. In other words, the personal computer 1 has quick capture mode in which the power is turned on when the shutter button 10 is operated.

In step S1, if it is determined that the power has been turned on not by operating the shutter button 10, the processing goes to step S2. In step S2, it is determined whether the power has been turned on by user's performing a predetermined operation on the personal computer 1 held in the suspend mode. If it is determined that the power has been turned on from the suspend mode, the processing goes to step S3. In step S3, resume processing is executed. To be more specific, the normal mode (the state just before the suspend mode is set) is resumed by restoring the information saved in the RAM 54 at the setting of the suspend mode, for example by resuming the OS 54C.

On the other hand, if it is determined in step S2 that the power has been turned on not from the suspend mode, but the power to the personal computer 1 was off and it has been turned on by user's operating the power switch 40, the processing goes to step S4. In step S4, POST (Power On Self Test) processing is executed. In the POST processing, the component devices of the personal computer are powered on for operation test. When each device is found operating normally, the processing goes to step S5, in which the OS 56C stored in the HDD 56 is loaded into the RAM 54, upon which the OS starts in the normal mode.

If, in step S1, it is determined that the power has been turned on by user's pressing the shutter button 10, or it is determined that quick capture processing has been instructed by the user, the processing goes to step S6. In the quick capture processing, the imaging operation by the user is quickly responded by the personal computer 1 when the same is in the power-off mode or the suspend mode, except for the normal mode, thereby taking a picture through the CCD video camera 23 and the captured picture is recorded.

In step S6, only fewest possible devices necessary for image pick-up through the CCD video camera 23 are initialized and started. For example, the CPU 52, the HDD 56, and the LCD controller 83 are put in the power saving mode, the graphics chip 81 is initialized, and the other devices are powered off or put in the power saving mode in which the minimum necessary power is supplied is executed. These settings are executed by the CPU 52 alone, namely independently of the OS, through the quick capture program 74, which is a hardware-dependent low-level system program equivalent to BIOS. Namely, these settings are executed independently without starting the OS 56C stored in the HDD 56 or the OS 54C stored in the RAM 54. When these settings have been completed, then, in step S7, the image being picked up through the CCD video camera 23 is captured to be displayed on the display block 3.

In step S8, it is determined whether or not the shutter button 10 has been operated. The shutter button 10 is pressed in one of two manners; half pressing and full pressing. In the half-pressed state, the picture shown on the display block 3 is put in the still (freeze) state. In the fully-pressed state, the captured image (the image in the half-pressed state shown on the display block 3) is stored on the HDD 56 for example. That is to say, the user can check the image captured in the half-pressed state being displayed on the display block 3 for desired focus and composition for example. If the focus and composition are as desired, the user fully presses the shutter button 10 to record the picture.

The processing operations of steps S7 and S8 are repeated until the shutter button 10 is pressed. When the shutter button 10 is pressed, the processing goes to step S9. In step S9, it is determined whether or not the shutter button 10 is in the fully-pressed state. If the shutter button 10 is found not in the fully-pressed state, or it is in the half-pressed state, the processing goes to step S10, in which the picture shown on the display block 3 is put into freeze state. Then, the processing returns to step S7 to repeat the subsequent processing operations.

On the other hand, if the shutter button 10 is found fully pressed in step S9, then it is determined in step S11 whether or not the ESC (Escape) key is pressed at the same time. If the ESC key is found not pressed simultaneously, the processing goes to step S12, in which the picture shown on the display block 3 is recorded onto the HDD 56. After the image data is recorded on the HDD 56, the processing goes to step S7 to repeat the subsequent processing operations, making it ready for recording another picture.

If, in step S11, the ESC key is found to have pressed at the same time as full-pressing of the shutter button 10, the processing returns to step S4, in which the POST processing is executed. Then the processing goes to step S5, in which the OS is started.

Thus, pressing the ESC key at the same time as the full-pressing of the shutter button 10 ends the quick capture processing, upon which the OS is started in the normal mode.

Obviously, the user can also end the quick capture processing by a predetermined operation without recording any image on the HDD 56.

In the above-mentioned embodiment, in the quick capture processing, an image obtained by half-pressing the shutter button 10 is a still picture and, if this picture is as desired, the user fully presses the shutter button 10 to record the picture. It will be apparent to those skilled in the art that a picture obtained as a result that the shutter button is fully pressed in the power-off state or the suspend mode may be immediately recorded onto the HDD 56.

Thus, when image capturing is instructed in the power-off state or the suspend mode, only fewest possible devices necessary for the image capturing are controlled by the quick capture program 74, which is a hardware-dependent low-level system program equivalent to BIOS stored in the ROM 69, thereby quickly capturing a picture and saving the power consumption of the personal computer.

It should be noted that the computer programs for executing the above-mentioned processing operations may be installed on the personal computer 1 by means of information storage media such as magnet disc and CD-ROM, and network transmission media such as the Internet and digital satellite communication.

As described and according to the present invention, there are provided the information processing apparatus, the information processing method, and the program storage medium, which are capable of starting only fewest possible means necessary for the image capturing, when image capturing is instructed with the information processing apparatus in power-off state or in power saving mode. Through these means, a desired image is picked up and recorded. The novel setup allows the user to quickly capture images whenever the image pick up is needed without missing the timing of image pick-up.

While the preferred embodiment of the present invention has been described using specific terms, such description is for illustrative purposes only, and it is to be understood that changes and variations may be made without departing from the spirit or scope of the appended claims.

What is claimed is:

1. An information processing apparatus comprising
an instructing means for instructing image capturing and for instructing to put fewest possible means required for image capturing in an energy saving mode;
an image pick-up means for imaging a subject as instructed through said instructing means and generating image data based on the imaged subject;
a recording means for recording said image data generated by said image pick-up means;
an activating means for activating in said energy saving mode said fewest possible means required for image capturing including at least said image pick-up means and said recording means when said instructing means is instructed with said information processing apparatus in said energy saving mode on the basis of a hardware-dependent low-level system program equivalent to a BIOS (Basic Input Output System) without starting an OS (Operating System); and
a quick capture means for controlling said fewest possible means activated by said activating means and for recording said image data generated by said image pick-up means onto said recording means.

2. The information processing apparatus according to claim 1, wherein said image pick-up means is a CCD (Charge Coupled Device) video camera, and if instructed for image capturing through said instructing means with said information processing apparatus in one of said power-off state and an energy saving mode, said activating means starts at least said CCD video camera in said energy saving mode.

3. The information processing apparatus according to claim 1, wherein said recording means is a hard disc drive and, if instructed for iniage capturing through said instructing means with said information processing apparatus in one of said power-off state and an energy saving mode, said activating means starts at least said hard disc drive in said energy saving mode.

4. The information processing apparatus according to claim 1, wherein all of said instructing means, a CCD (Charge Coupled Device) video camera composing said image pick-up means, a hard disk composing said recording means, and said activating means are integrally accommodated in a portable housing.

5. The information processing apparatus according to claim 1 further comprises an instructing button and wherein the instructing of image capturing and putting the fewest possible means required for image capturing in an energy saving mode is initiated by activating only said instructing button.

6. A method for use with an information processing apparatus, said method comprising the steps of:

instructing image capturing and instructing to put fewest possible means required for image capturing in an energy saving mode by use of an instructing means;

imaging a subject as instructed through said instructing means and generating image data based on the imaged subject by use of an image pick-up means;

recording said image data generated by said image pick-up means by use of a recording means;

activating, by use of an activating means, in said energy saving mode said fewest possible means required for image capturing including at last said image pick-up means and said recording means when said instructing means is instructed with said information processing apparatus in said energy saving mode on the basis of a hardware-dependent low-level system program equivalent to a BIOS (Basic Input Output System) without starting an OS (Operating System); and controlling, by use of a quick capture means, said fewest possible means activated by said activating means and recording said image data generated by said image pick-up means onto said recording means.

7. The method according to claim 6, wherein said image pick-up means is a CCD (Charge Coupled Device) video camera, and if instructed for image capturing through said instructing means with said information processing apparatus in one of said power-off state and an energy saving mode, said activating means starts at least said CCD video camera in said energy saving mode.

8. The method according to claim 6, wherein said recording means is a hard disc drive and, if instructed for image capturing through said instructing means with said information processing apparatus in one of said power-off state and an energy saving mode, said activating means starts at least said hard disc drive in said energy saving mode.

9. The method according to claim 6, wherein all of said instructing means, a CCD (Charge Coupled Device) video camera composing said image pick-up means, a hard disk composing said recording means, and said activating means are integrally accommodated in a portable housing.

10. The information processing apparatus according to claim 6 wherein the information processing apparatus further comprises an instructing button and wherein the instructing of image capturing and putting the fewest possible means required for image capturing in an energy saving mode is initiated by activating only said instructing button.

11. An information processing apparatus comprising:

an instructing means for instructing image capturing and for instructing to activate fewest possible means required for image capturing when said information processing apparatus is in a power-off state;

an imaging pick-up means for imaging a subject as instructed through said instructing means and generating image data based on the imaged subject;

a recording means for recording said image data generated by said image pick-up means;

an activating means for activating said fewest possible means required for image capturing when said instructing means is instructed with said information processing apparatus in said power-off state on the basis of a hardware-dependent low-level system program equivalent to a BIOS (Basic Input Output System) without starting an OS (Operating System); and a quick capturing means for controlling said fewest possible means activated by said activating means and for recording said image data generated by said image pick-up means onto said recording means.

12. A program storage medium for storing a computer program that is executed in an information processing apparatus, wherein said computer program comprises the step of:

controlling the information processing apparatus so as to instruct image capturing and put fewest possible means required for image capturing in an energy saving mode by use of an instructing means, image a subject as instructed and generate image data based on the imaged subject by use of an image pick-up means, record the generated image data by use of a recording means, activate in said energy saving mode said fewest possible means required for image capturing including at least said image pick-up means and said recording means when said instructing means is instructed with said information processing apparatus in said energy saving mode on the basis of a hardware-dependent low-level system program equivalent to a BIOS (Basic Input Output System) without starting an OS (Operating System), and control the activated fewest possible means and record said image data generated by said image pick-up means onto said recording means.

13. A program storage medium for storing a computer program that is executed in an information processing apparatus, wherein said computer program comprises the step of:

controlling the information processing apparatus so as to instruct image capturing and activating of fewest possible means required for image capturing when said information processing apparatus is in a power-off state by use of an instructing means, image a subject as instructed through said instructing means and generate image data based on the imaged subject by use of an imaging pick-up means, record said image data generated by said image pick-up means by use of a recording means, activate said fewest possible means required for image capturing when said instructing means is instructed with said information processing apparatus in said power-off state on the basis of a hardware-dependent low-level system program equivalent to a BIOS (Basic Input Output System) without starting an OS (Operating System), and control the activated fewest possible means and record said image data generated by said image pick-up means onto said recording means.

\* \* \* \* \*